C. W. ESCHERT.
PLOW ATTACHMENT.
APPLICATION FILED AUG. 12, 1909.
948,478.
Patented Feb. 8, 1910.
2 SHEETS—SHEET 2.
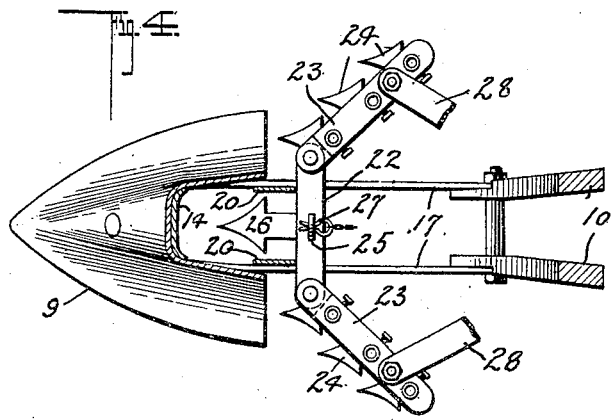
WITNESSES
Philip H. Burch
H. A. Fairburn
INVENTOR
Carl W. Eschert,
Attorney
Max A. Schmidt

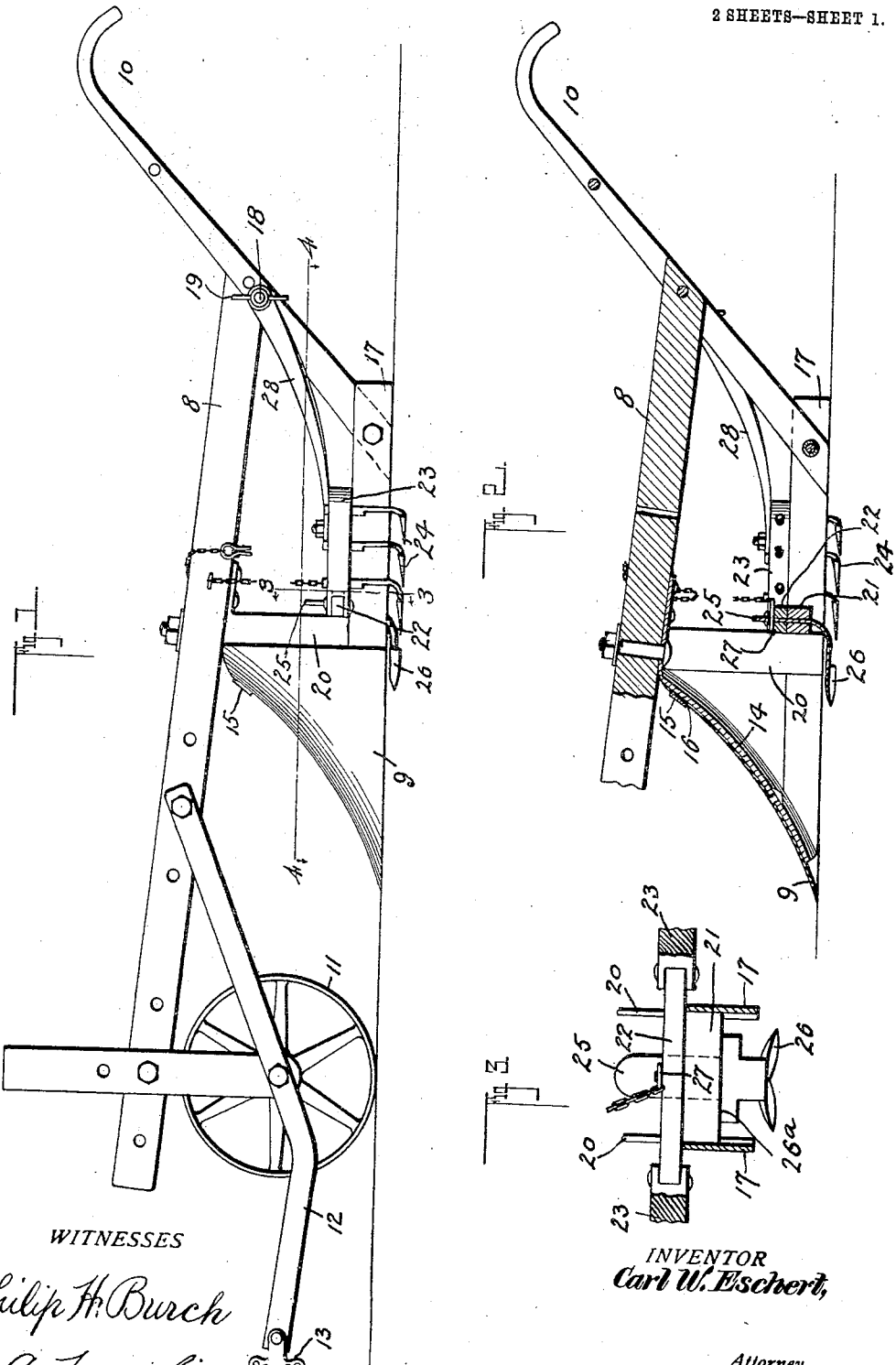

UNITED STATES PATENT OFFICE.

CARL W. ESCHERT, OF MILWAUKEE, WISCONSIN.

PLOW ATTACHMENT.

948,478.  Specification of Letters Patent.  Patented Feb. 8, 1910.

Application filed August 12, 1909. Serial No. 512,538.

*To all whom it may concern:*

Be it known that I, CARL W. ESCHERT, a citizen of the United States, residing at Milwaukee, in the county of Milwaukee and State of Wisconsin, have invented certain new and useful Improvements in Plow Attachments, of which the following is a specification.

This invention is a cultivator attachment for plows, and it consists in a novel construction and arrangement of parts to be hereinafter described and claimed.

The invention is designed more particularly for potato culture, although not limited thereto, and its object is to provide an attachment for this purpose which is simple in structure, and highly efficient in operation, and which can be readily applied to, or removed from the plow.

In the accompanying drawings forming a part of this specification, Figure 1 is a side elevation showing the cultivator attachment in position on the plow. Fig. 2 is a central longitudinal section of the rear end of the plow. Fig. 3 is a cross section on the line 3—3 of Fig. 1. Fig. 4 is a horizontal section on the line 4—4 of Fig. 1.

As shown in the drawing, the invention is applied to a shovel plow, the beam of which is indicated at 8, and the share at 9. The rear end of the beam is fitted with the usual handles 10, and at its front end is mounted a gage wheel 11, and a draft bar 12 provided with a clevis 13. The gage wheel is vertically adjustable in an obvious manner to regulate the depth of penetration of the share.

The share 9 is carried by a stock 14 having a curved shape to conform to the shape of the share, and the latter is bolted to the stock as shown. At the top of the stock is a strap 15 under which is received a tongue 16 formed at the top of the share, which assists to hold the latter in place on the stock.

The upper end of the stock 14 is shaped to fit the under side of the beam 8, to which it is bolted, or otherwise fastened. The lower end of the stock is formed with a pair of spaced rearwardly extending runners 17 to which the lower ends of the handles 10 are connected. The handles are also fastened to the beam by a rod 18 passing transversely therethrough, and projecting from both sides thereof, said projecting ends being screw threaded to receive wing nuts 19, which are for a purpose to be presently described.

The runners 17, and that portion of the stock which fits the under side of the beam 6, are connected by braces 20, and behind these braces, the runners are braced by a cross bar 21 extending therebetween. In this cross bar is a vertical slot which is for a purpose to be presently made clear.

The cultivator attachment comprises a beam 22 carrying at its ends hinged sections 23 on which the cultivator shovels are mounted. The slot in the cross bar 21 is adapted to receive the shank 25 of a cultivator shovel 26. When in position, the shank extends a short distance above the cross bar, and the under side of the cross bar is engaged by a shoulder 26ᵃ on the shank.

The cultivator attachment in mounted on the plow by placing the beam 22 on top of the cross bar 21, so as to extend transversely of the plow, and with the hinged sections 23 extending outwardly and rearwardly at a slant, behind the share 9. The beam 22 has a slot to receive the projecting upper end of the shank 25, and above the beam, the shank has a transverse slot through which is passed a cotter 27 carried by a chain which is made fast to the beam 8. The cotter engages the top of the beam 22, and as the shoulder 26ᵃ engages the under side of the cross bar 21, it will be seen that the cultivator beam is rigidly secured to the cross bar.

To the free ends of the hinged sections are connected braces 28 which extend rearwardly to the projecting ends of the rods 18, and are provided with apertures to receive said ends, on which they are secured by the wing nuts 19.

The plow, as well as the attachment, is simple in construction, and can therefore be cheaply manufactured, and the attachment can be readily mounted in working position on the plow, or removed therefrom, and it effectually serves the purpose for which it is designed. The cultivator shovels are set slightly lower than the share, by reason of which the soil will be thoroughly loosened, and all weeds will be destroyed by cutting up of the roots thereof by the shovels. The hinged sections extend outwardly sufficiently so that the entire space between the rows of plants will be worked, and the weeds will therefore be destroyed close up to the plants.

I claim:

1. The combination with the share and stock of a plow, the stock having runners; of a cross bar connecting the runners, and having a vertical opening, a cultivator shovel having its shank mounted in said opening, and projecting above the cross bar, a cultivator beam mounted on the cross bar, and having an opening to receive the projecting end of the aforesaid shovel shank, hinged sections carried at the ends of the beam, shovels carried by said sections, and means for holding the sections at adjustment.

2. The combination with the share and stock of a plow, the stock having runners; of a cross bar connecting the runners, and having a vertical opening, a cultivator shovel having its shank mounted in said opening, and projecting above the cross bar, there being a shoulder on said shank which engages the under side of the cross bar, a cultivator beam mounted on the cross bar, and having an opening to receive the projecting end of the aforesaid shovel shank, hinged sections carried at the ends of the beam, shovels carried by said sections, and means for holding the sections at adjustment.

In testimony whereof I affix my signature in presence of two witnesses.

CARL W. ESCHERT.

Witnesses:
HENRY VOCKE,
F. W. KLATT.